April 21, 1925.

T. B. WALKER

TRAY AND SUPPORT THEREFOR

Filed May 5, 1924

1,534,095

WITNESSES
W. A. Williams

INVENTOR
T. B. Walker
BY
ATTORNEYS

Patented Apr. 21, 1925.

1,534,095

UNITED STATES PATENT OFFICE.

THOMAS BATES WALKER, OF NASHVILLE, TENNESSEE.

TRAY AND SUPPORT THEREFOR.

Application filed May 5, 1924. Serial No. 711,132.

*To all whom it may concern:*

Be it known that I, THOMAS B. WALKER, a citizen of the United States, and a resident of Nashville, in the county of Davidson and State of Tennessee, have invented certain new and useful Improvements in Trays and Supports Therefor, of which the following is a specification.

My present invention relates generally to trays and tray supports, and is directed more particularly to a tray and tray support therefor for automobiles, my object being the provision of a tray which may be applied in connection with the side of an automobile body or the door thereof, which may be easily and quickly placed in position and removed therefrom and which will efficiently serve for curb use in connection with the supply of ice cream, soda water and soft drinks to the occupants of automobiles.

According to my invention I propose a tray having a support with respect to which the tray is adjustable, the support being so formed as to permit of adjustment of the tray and at the same time provide for an effective and efficient three point engagement with the opposite surfaces of the side wall or door of an automobile in order that the support may be effectively engaged therewith and may at the same time be easily and quickly placed in position and removed therefrom without danger of scratching or otherwise marring the finish of the automobile or its upholstery.

Figure 1:
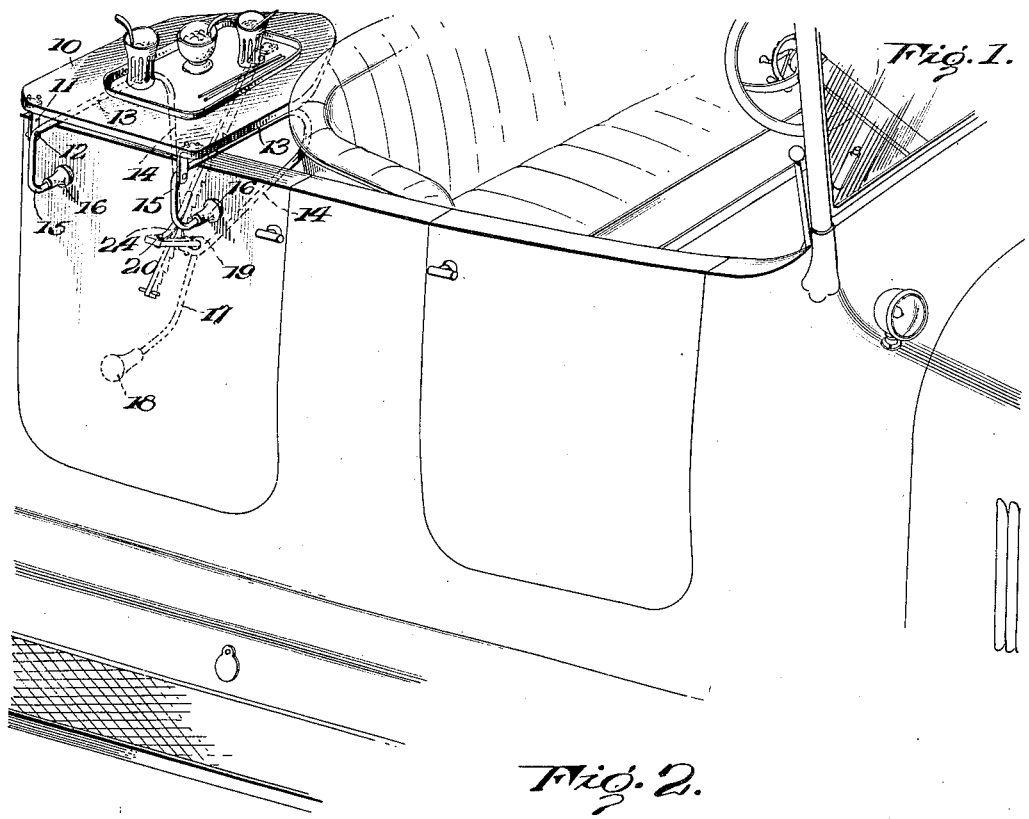
Figure 2:
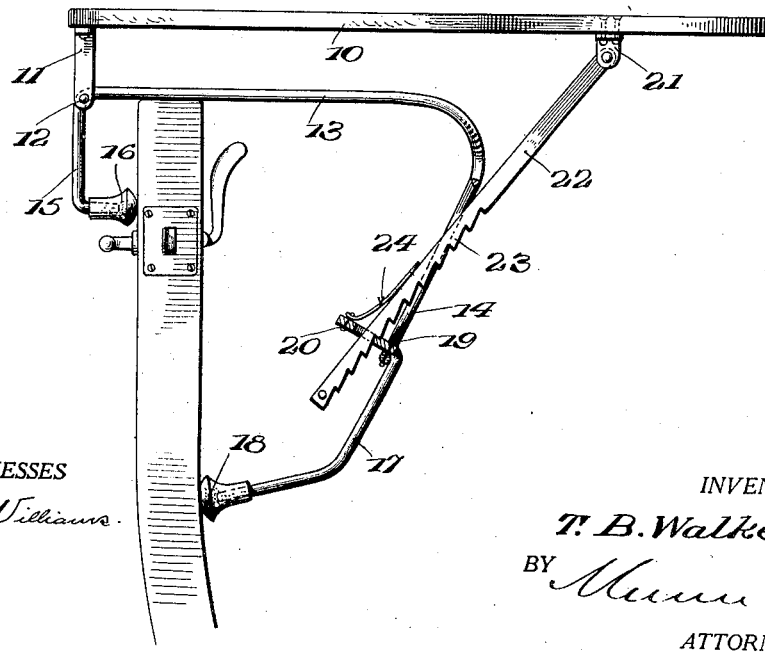

In the accompanying drawing which illustrates my present invention and forms a part of this specification, Figure 1 is a perspective view illustrating the practical application of my invention, and Figure 2 is a sectional side view of my improved tray and support, showing the same partly broken away and in section.

Referring now to these figures my invention proposes a tray which may be in the nature of a flat board 10 and the like of any suitable shape, this tray having at one end and at its opposite sides rigid depending arms 11 pivotally connected as at 12 to the upper side bars 13 of the tray supporting frame adjacent to one end of the latter.

The tray supporting frame has at one end a depending V-shaped portion 14, the upper portions of the extensions of which are bent horizontally to form the upper side bars 13, the latter having at their free ends adjacent to the pivoted tray arms 11 depending extensions 15 provided with inturned extremities, the latter supporting caps 16 of soft material so as to adapt the same for engagement with the surface of an automobile without danger or scratching or otherwise marring such surface.

The frame of the support also includes a depending angular supporting arm 17 whose lower free end has a cap 18 similar to the caps 16 and whose upper end is secured as at 19 to the lower end of the depending V-shaped portion of the frame and is further provided with a flat angular and apertured extension plate 20.

In view of the fact that the arm 17 depends below and between the depending extensions 15 of the upper side bars 13 it is thus obvious there is a properly disposed three point engagement of the frame carried caps 16 and 18 in connection with the body side or door of an automobile as well as any other support of this nature opposite faces of which are adapted for engagement by the frame extensions with their caps 16 and 18.

It is also quite obvious that the thickness of the body side of an automobile or its door will determine whether or not the upper side bars of the frame rest in connection therewith in truly horizontal or more or less inclined positions and hence in view of the fact that it may result that the frame is more or less inclined, it is of course desired to adjust the tray 10 by virtue of the pivotal arms 11 thereof, the opposite end of the tray having a bracket 21 upon its lower face centrally between its sides. To this bracket 21 one end of an adjustable supporting arm 22 is pivotally connected, this arm depending at its lower end through the slot of the beforementioned angular extension plate 20 and having a series of teeth 23 along its lower portion engageable with one side wall of the slot. The lower portion of the adjustable arm 23 is furthermore engaged by a spring 24 upstanding from the plate 20 so that it is thus held under tension in adjustable connection with the said extension plate while capable of manual movement against the tension of spring 24 so that it may be shifted up or down in order to level the supporting tray 10.

It is obvious from the foregoing that my invention provides a construction and arrangement of parts well adapted to the carrying out of the objects first above mentioned and that my improved tray and its supports are not only capable of ready engagement with and disengagement from effective position which is highly desirable in a device of this nature and for this purpose, but my invention also proposes a construction and arrangement which will be simple and inexpensive, strong and effective, and one which will be durable in use.

I claim:

1. A tray and its support of the character described including a rigid frame having inturned engaging members at one side in spaced apart relation and an inturned engaging member at its opposite side opposing the first mentioned engaging members and located below and between the same, and a tray having a pivotal connection with one side of the frame and having an adjustable supporting arm at the opposite side of the frame and in movable connection with the latter.

2. A tray and its support including a rigid frame having upper side bars and a depending portion at one end of said side bars, the opposite ends of said side bars having depending portions provided with inturned engaging members, an arm extending downwardly from the depending portion of the frame having an engaging member opposing the first mentioned engaging members and located below and between the same, a tray having rigid depending arms at one end pivotally connected to the said side bars adjacent to one end of the latter, and a pivoted supporting arm depending from the said tray and in adjustable engagement with the frame at the lower end of its depending portion as described.

3. A tray and its support including a supporting frame having spaced parallel side bars and a depending V-shaped extension at one end of said side bars, the other ends of said side bars having depending extensions provided with inturned engaging members, a supporting arm secured to and extending downwardly from the depending portion of the frame, having an engaging member opposing the first mentioned engaging members and located below and between the same, said supporting arm having at its upper end an angular slotted extension plate, a tray pivotally supported adjacent to one end in connection with one side of the said frame, a pivoted adjusting arm depending from the tray adjacent to its opposite end and through the said slotted extension plate, having teeth along one side thereof, and a spring upstanding from the extension plate and engaging the opposite side of the adjusting arm as described.

THOMAS BATES WALKER.